United States Patent
Babu (10) Patent No.: US 7,996,862 B2
(45) Date of Patent: Aug. 9, 2011

(54) METADATA MAPPING TO SUPPORT TARGETED ADVERTISING

(75) Inventor: Suresh P. Babu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 1423 days.

(21) Appl. No.: 10/184,794

(22) Filed: Jun. 27, 2002

(65) Prior Publication Data

US 2004/0003396 A1 Jan. 1, 2004

(51) Int. Cl.
- H04N 7/10 (2006.01)
- H04N 7/025 (2006.01)
- H04N 60/32 (2006.01)
- H04N 60/33 (2006.01)

(52) U.S. Cl. .................. 725/34; 725/9; 725/14

(58) Field of Classification Search ............ 725/34, 725/46

See application file for complete search history.

(56) References Cited

U.S. PATENT DOCUMENTS

| | | | |
|---|---|---|---|
| 5,754,939 A * | 5/1998 | Herz et al. .................... | 455/3.04 |
| 6,160,989 A | 12/2000 | Hendricks et al. | |
| 6,177,931 B1 * | 1/2001 | Alexander et al. .............. | 725/52 |
| 6,446,261 B1 * | 9/2002 | Rosser ........................... | 725/34 |
| 6,637,029 B1 * | 10/2003 | Maissel et al. .................. | 725/46 |
| 6,698,020 B1 * | 2/2004 | Zigmond et al. ................ | 725/34 |
| 7,150,030 B1 * | 12/2006 | Eldering et al. ................ | 725/46 |
| 7,331,057 B2 * | 2/2008 | Eldering et al. ................ | 725/32 |
| 2001/0021994 A1 * | 9/2001 | Nash .............................. | 725/42 |
| 2002/0052925 A1 * | 5/2002 | Kim et al. ...................... | 709/217 |
| 2003/0046148 A1 * | 3/2003 | Rizzi et al. ..................... | 705/14 |
| 2004/0015608 A1 * | 1/2004 | Ellis et al. ..................... | 709/246 |
| 2005/0071863 A1 * | 3/2005 | Matz et al. ....................... | 725/9 |

FOREIGN PATENT DOCUMENTS

| | | |
|---|---|---|
| WO | WO9828906 (A2) | 7/1998 |
| WO | WO9966719 (A1) | 12/1999 |

OTHER PUBLICATIONS

Kohei Inoue and Kiichi Urahama, "Collaborative Filtering Based on Correlation between Items," Faculty of Visual Communication Design, Kyushu Institute of Design, Fukuoka-shi, 815-8540 Japan, D-II vol. J85-D-II No. 3, pp. 533-536, 2002.

Ari Juels, "Targeted Advertising . . . And Privacy Too," RSA Laboratories, Bedford, MA 01730, USA, D. Naccache (Ed.): CT-RSA 2001, LNCS 2020, pp. 408-424, 2001—copyright Springer-Verlag Berlin Heidelberg 2001.

Predictive Networks, "ADirector—Advanced Targeting and Ad Management for Digital Television," http://www.predictivenetworks.com/products/advertising.html, printed Jun. 26, 2002, pp. 1-3.

European Search Report mailed Mar. 8, 2011 for European Patent Application No. 03011226.2, a counterpart foreign application of U.S. Appl. No. 10/184,794.

* cited by examiner

*Primary Examiner* — Dominic D Saltarelli
(74) *Attorney, Agent, or Firm* — Lee & Hayes, PLLC (57) ABSTRACT

A television server generates a metadata map that represents relationships among media content description data based on viewing patterns of multiple viewers. The television server sends the metadata map to a client device. The client device targets advertisements to a viewer based on the metadata map and a recent viewing history of the viewer.

19 Claims, 6 Drawing Sheets

METADATA MAPPING TO SUPPORT TARGETED ADVERTISING

TECHNICAL FIELD

This invention relates to television entertainment architectures that support targeted advertising based on a metadata map.

BACKGROUND

Conventional television entertainment systems are configured to provide advertisements along with media content such as television programs, movies, video-on-demand (VOD), and access to one or more web sites. Some television entertainment systems target particular advertisements to one or more specific users based on gathered demographic information that describes a user. This information may be used to determine which users may be most interested in which advertisements. Many privacy regulations are now in effect that prevent the broad collection of user demographic information as described. However, the television entertainment systems still have a desire to target advertisements to specific users or groups of users based on perceived interests of those users within the provision of the law.

SUMMARY

Targeted advertising based on metadata mapping is described. An interactive television server receives data that describes media content and data that describes viewing patterns of multiple viewers. The television server generates a metadata map that describes relationships among the media content description data based on the viewing pattern data. The television server sends the metadata map to a client device. The client device selects advertisements to display to a viewer based on a combination of the relationships described by the metadata map and media content recently viewed by the viewer.

BRIEF DESCRIPTION OF THE DRAWINGS

The same numbers are used throughout the drawings to reference like features and components.

DETAILED DESCRIPTION

Targeted advertising may be implemented through the generation and maintenance of metadata maps. Metadata maps describe relationships associated with media content. The metadata maps may describe relationships among multiple media content (e.g., television programs, movies, or websites), relationships between characteristics of media content (e.g., categories associated with television programs, movies, or websites), and relationships between media content and the characteristics of the media content. In addition to describing relationships associated with media content, the metadata maps may also describe relationships between advertisements, media content, and characteristics of the advertisements or media content.

Once established, the metadata maps may be used to target advertisements to one or more television entertainment system users. For example, if a user is viewing a particular television program, the metadata maps may be used to identify advertisements in which viewers of the particular television program are most apt to be interested.

The following discussion is directed to television-based entertainment systems that support targeted advertising, such as interactive TV networks, cable networks that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and methods can be used in any of these systems and for any types of client devices, they are described in the context of the following exemplary environment.

Exemplary Environment

Figure 1:
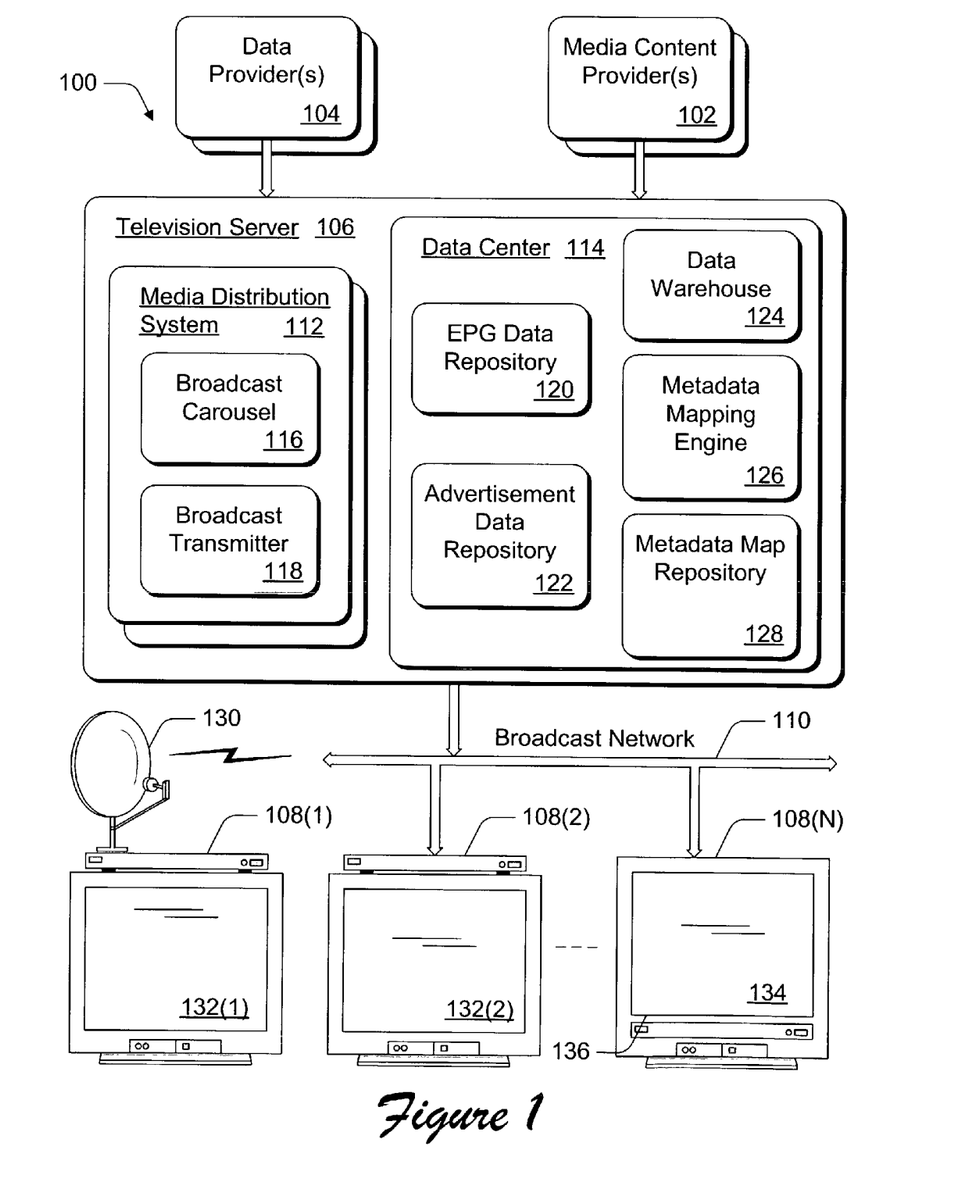
FIG. 1 illustrates an exemplary environment that supports targeted advertising using metadata maps.

FIG. 1 illustrates an exemplary environment 100 in which an architecture that supports targeted advertising using metadata maps may be implemented. Exemplary environment 100 is a television entertainment system that facilitates distribution of content and program data to multiple viewers. The environment 100 includes one or more media content providers 102, one or more data providers 104, a television server 106, and multiple client devices 108(1), 108(2), . . . , 108(N) coupled to the television server 106 via a broadcast network 110.

Media content provider 102 provides media content and data associated with the media content to the television server 106. Media content may include, for example, television programs, movies, video-on-demand, and advertisements. The associated data may include electronic program guide (EPG) data such as program titles, ratings, characters, descriptions, genres, actor names, station identifiers, channel identifiers, schedule information, and so on.

Data provider 104 provides additional data associated with media content, advertisements, and/or viewer preferences. Data providers 104 may include companies such as Nielsen Media Research, which compiles data that describes television viewing habits.

Television server 106 includes one or more media distribution systems 112 and a data center 114. The media distribution system 112 includes a broadcast carousel 116 and a broadcast transmitter 118. The broadcast carousel 116 stores media content and advertisements that have been received from the media content providers. The broadcast transmitter 118 distributes the media content and advertisements that are stored on the broadcast carousel 116 to the client devices 108.

Data center 114 includes an EPG data repository 120, and advertisement data repository 122, a data warehouse 124, a metadata mapping engine 126, and a metadata map repository 128. The EPG data repository 120 stores data that can be used to generate an electronic program guide listing available media content. The data center provides at least portions of the EPG data repository 120 to the media distribution system 112 for transmission to one or more client devices 108. The advertisement data repository 122 stores advertisements that may be broadcast to the client devices. Advertisements are copied from the advertisement data repository 122 to the broadcast carousel 116 of the media distribution system 112 for transmission to one or more client devices 108. The data warehouse 124 stores any additional data received that is in any way associated with media content. This data may include additional descriptions, ratings, categorizations, and the like. The metadata mapping engine 126 generates metadata maps that describe, for example, relationships between media content, advertisements, and media categories. The metadata map repository 128 stores the metadata maps that are generated by the metadata mapping engine 126. At least portions of the metadata maps are transmitted to one or more client devices 108 through the broadcast carousel 116. Client device 108 then targets advertisements based on the received metadata maps.

Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

Environment 100 can include any number of media content providers, any number of data providers, and any number of client devices coupled to a television server. The television server 106 may include a data center and any number of media distribution systems.

Client devices 108 can be implemented in a number of ways. For example, a client device 108(1) receives broadcast content from a satellite-based transmitter via a satellite dish 130. Client device 108(1) is also referred to as a set-top box or a satellite receiving device. Client device 108(1) is coupled to a television 132(1) for presenting the content received by the client device (e.g., audio data and video data), as well as a graphical user interface. A particular client device 108 can be coupled to any number of televisions 132 and/or similar devices that can be implemented to display or otherwise render content. Similarly, any number of client devices 108 can be coupled to a television 132.

Client device 108(2) is also coupled to receive broadcast content from broadcast network 110 and provide the received content to associated television 132(2). Client device 108(N) is an example of a combination television 134 and integrated set-top box 136. In this example, the various components and functionality of the set-top box are incorporated into the television, rather than using two separate devices. The set-top box incorporated into the television may receive broadcast signals via a satellite dish (similar to satellite dish 130) and/or via broadcast network 110. In alternate implementations, client devices 108 may receive broadcast signals via the Internet or any other broadcast medium.

In addition to receiving data from the television server 106, client device 108 may be implemented to send data to the television server. In one implementation, a user may choose to have their viewing history collected and sent to the television server where it may be incorporated with viewing histories collected from other users to generate the metadata maps. In one implementation, the transmission of data from the client device 108 to the television server 106 may be implemented using back channel capabilities.

Client device 108 also receives a metadata map that is generated by the metadata mapping engine 126 to enable targeted advertising. When an application program such as an electronic program guide (EPG) executed on the client device 108 requests an advertisement, the received metadata map may be used to identify an advertisement in which a user is likely to be interested, based on programs recently viewed by the user.

Exemplary Metadata Maps

Figure 2:
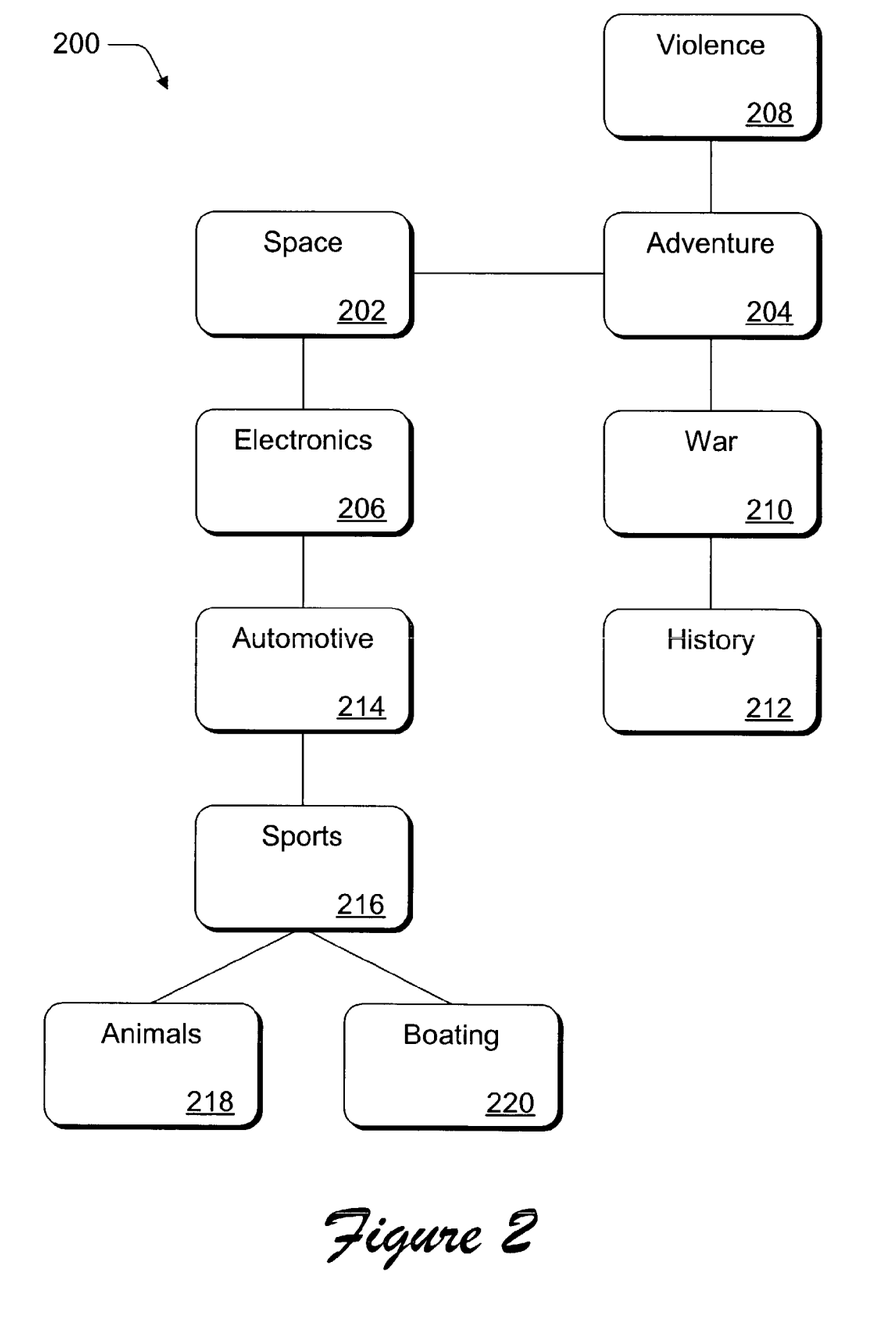
FIG. 2 illustrates an exemplary metadata map of select media categories.

FIG. 2 illustrates an exemplary metadata map of select media categories. The metadata map 200 may be generated by the metadata mapping engine 126, and describes relationships between categories based on user preferences. For example, viewers who watch programs that are associated with a space category 202 are likely to also watch programs that are associated with either an adventure category 204 or an electronics category 206. Similarly, viewers who are interested in an adventure category 204 are also likely to be interested in a space category 202, a violence category 208, and a war category 210.

Figure 3:
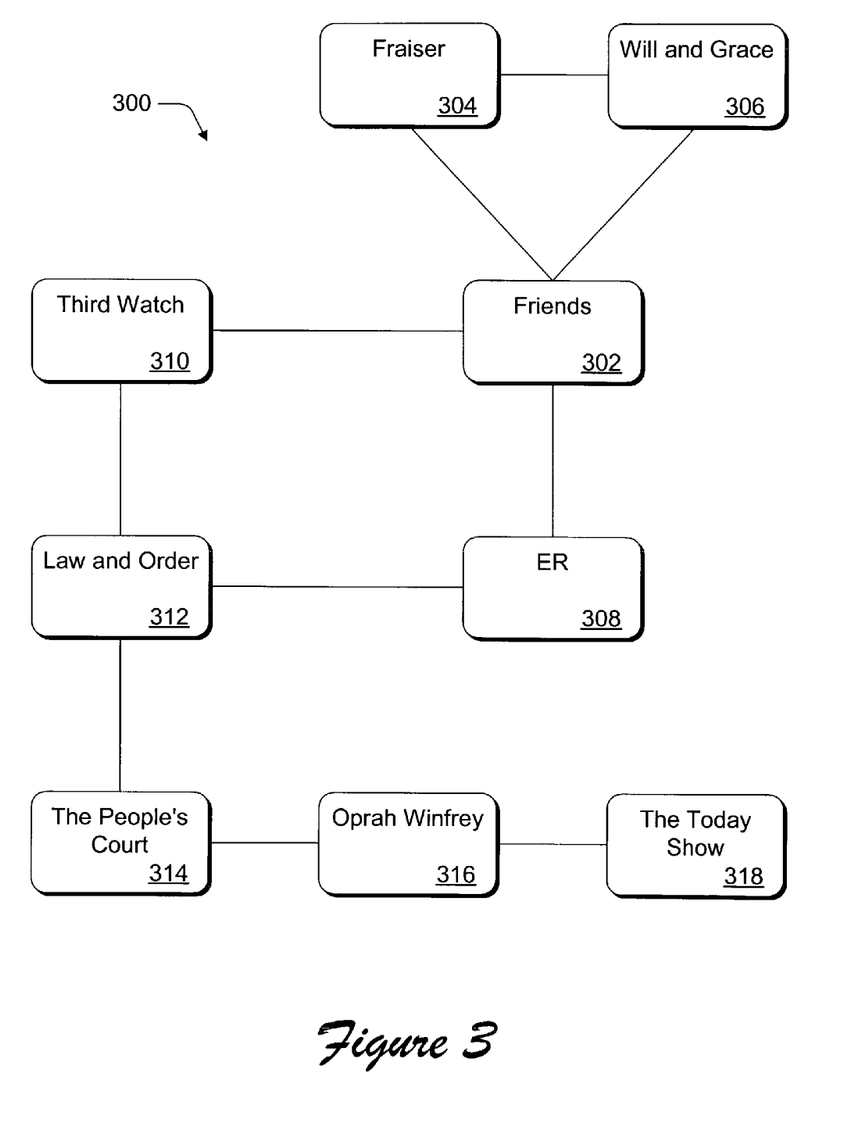
FIG. 3 illustrates an exemplary metadata map of select television programs.

FIG. 3 illustrates an exemplary metadata map of select television programs. The metadata map 300 may also be generated by the metadata mapping engine 126, and describes relationships between television programs based on user viewing patterns. For example, viewers who watch the television program Friends 302 are likely to also watch Fraiser 304, Will and Grace 306, Third Watch 310, and ER 308. Similarly, viewers who watch Law and Order 312 are likely to also watch Third Watch 310, ER 308, and The People's Court 314.

The metadata maps illustrated in FIGS. 2 and 3 may be generated based on data collected from client devices and/or based on data gathered from external data providers such as Nielsen Media Research. Data collected from client devices may include information about which ads have been displayed, which ads have been selected by a user (e.g., through an interactive user interface), which web pages have been accessed by a user, which programs have been viewed by a user, and which video-on-demand purchases have been made by a user. Other metadata maps may also be generated to describe other relationships that exist among metadata associated with media content, including relationships between programs and categories, relationships between categories and advertisements, relationships between programs and advertisements, and relationships among advertisements.

Metadata maps may be stored using any number of techniques for relating data, such as a relational database or an object oriented database. In one implementation, metadata maps are generated using the Predictor schema included as part of the Microsoft Commerce Server.

Exemplary Client Device

Figure 4:
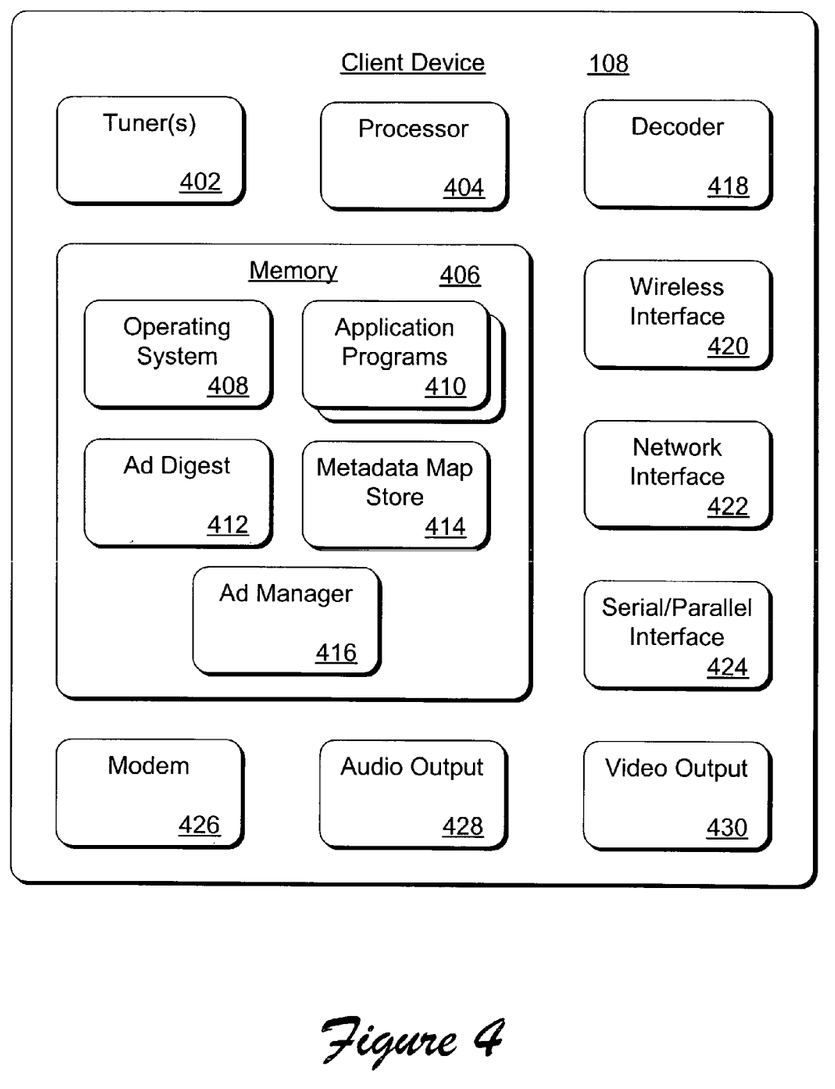
FIG. 4 illustrates selected components of an example client device.

FIG. 4 illustrates selected components of client device 108. Client device 108 may be implemented in a number of ways, including as a set-top box, a digital video recorder (DVR), a game console, a general purpose computer with broadcast reception capabilities, and so on. General reference is made herein to one or more client devices, such as client device 108.

Client device 108 includes one or more tuners 402. Tuners 402 are representative of one or more in-band tuners that tune to various frequencies or channels to receive television signals, as well as an out-of-band tuner that tunes to a broadcast channel over which the EPG data, for example, may be broadcast to client device 108.

Client device 108 also includes a processor 404 and at least one memory component 406. Examples of possible memory components include a random access memory (RAM), a disk drive, a mass storage component, and a non-volatile memory (e.g., ROM, Flash, EPROM, EEPROM, etc.). Alternative implementations of client device 108 can include a range of processing and memory capabilities. For example, full-resource clients can be implemented with substantial memory and processing resources, including a disk drive to store content for replay by the viewer. Low-resource clients, however, may have limited processing and memory capabilities, such as a limited amount of RAM, no disk drive, and limited processing capabilities.

Processor 404 processes various instructions to control the operation of client device 108 and to communicate with other electronic and computing devices. The memory component 406 stores various information and/or data such as content, EPG data, configuration information for client device 108, and/or graphical user interface information.

An operating system 408, one or more application programs 410, an ad digest 412, a metadata map store 414, and an ad manager 416 may be stored in memory 406 and executed on processor 404 to provide a runtime environment.

The application programs 410 that may be implemented at client device 108 can include a browser to browse the Web, an email program to facilitate electronic mail, an electronic program guide (EPG) that displays program listings available to a viewer, and so on. One or more of the application programs 410 may also display one or more advertisements.

Ad digest 412 stores data that describes advertisements that are currently available to the client device 108 from the broadcast carousel 116. The data that is stored in the ad digest 412 may be formatted in any number of ways. In one implementation, the ad digest data is formatted according to an XML schema that defines the structure for each advertisement description as follows:

```
<Ad>
    <URL>...</URL>
    <PageGroup>...</PageGroup>
    <Category>...</Category>
</Ad>
```

The <URL> tags are used to indicate a filename or other unique identifier associated with an advertisement.

The <PageGroup> tags are used to indicate a group that an advertisement belongs to. In one implementation, page groups associated with advertisements are based on the display size of the advertisements, such that all advertisements with the same display size are part of the same page group. This grouping allows applications to quickly access advertisements that will fit into specific display areas without distortion. Other page groups may be defined based on other characteristics of the advertisements such as the source of the advertisement or an implied category such as sports, electronics, movies, and so on. An advertisement description may include multiple sets of <PageGroup> tags, indicating that the advertisement belongs to multiple page groups.

The <Category> tags are used to indicate a category that an advertisement is associated with. Example categories may include adventure, science fiction, and comedy. An advertisement description may include multiple sets of <Category> tags, indicating that the advertisement is associated with multiple categories.

An example ad digest 412 that describes two available advertisements is given as:

```
<addigest>
    <ad adid="12" source="commerce">
        <image width="156" height="121"
            href="http://localhost/testad1.tbm">
        <jump-text title="title-foo">jumptext</jump-text>
        <pagegroups>
```

-continued

```
            <group>EPG</group>
            <group>Games</group>
        </pagegroups>
        <categories>
            <category>Entertainment</category>
        </categories>
    </ad>
    <ad adid="14" source="msn">
        <image width="156" height="121"
            href=http://localhost/testad2.tbm>
        <jump-text title="title-foo">jumptext</jump-text>
        <pagegroups>
            <group>EPG</group>
        </pagegroups>
        <categories>
            <category>Comedy</category>
            <category>Romance</category>
        </categories>
    </ad>
</addigest>
```

The first ad is associated with two page groups, "EPG" and "Games." The first ad is associated with one category, "Entertainment." The second ad is associated with one page group, "EPG", and two categories, "Comedy" and "Romance."

The metadata map store 414 stores one or more metadata maps generated by the metadata mapping engine 126 and received from the television server 106. The metadata maps stored in the metadata map store 414 describe relationships associated with media content and advertisements that are available from the television server.

Ad manager 416 handles application requests for advertisements and determines the most appropriate ad to fulfill each request. The ad manager 416 receives a request for an advertisement from an application program 410. In one implementation, the request includes a page group identifier that can be used to identify a group of advertisements that may satisfy the request. The ad manager 416 accesses the ad digest 412 to identify advertisements that can be used to satisfy the received request, for example, based on a designated page group. If there are multiple advertisements that can be used to satisfy the request, the ad manager 416 accesses one or more metadata maps stored in the metadata map store 414 to determine which of the ads identified through the ad digest 412 are most related to what a viewer is watching. For example, if a viewer has been watching a NASCAR race and then launches the EPG application, the EPG application may request an advertisement through the ad manager 416. When the ad manager access the ad digest 412, several advertisements may be identified that can be supplied to the EPG application in response to the request. The ad manager then accesses the metadata map store and selects an automobile advertisement over advertisements for jewelry and for a romantic comedy because the automobile advertisement is more closely related to the previously viewed program, the NASCAR race.

Client device 108 also includes a decoder 418 to decode a broadcast video signal, such as an NTSC, PAL, SECAM or other TV system video signal. Client device 108 further includes a wireless interface 420, a network interface 422, a serial and/or parallel interface 424, and a modem 426. Wireless interface 420 allows client device 108 to receive input commands and other information from a user-operated input device, such as from a remote control device or from another IR, Bluetooth, or similar RF input device.

Network interface 422 and serial and/or parallel interface 424 allows client device 108 to interact and communicate with other electronic and computing devices via various communication links. Although not shown, client device 108 may also include other types of data communication interfaces to communicate with other devices. Modem 426 facilitates communication between client device 108 and other electronic and computing devices via a conventional telephone line.

Client device 108 also includes an audio output 428 and a video output 430 that provide signals to a television or other device that processes and/or presents or otherwise renders the audio and video data. Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Methods for Targeting Advertisements Based on Metadata Maps

Targeted advertising may be described in the general context of computer-executable instructions, such as application modules, being executed by a computer. Generally, application modules include routines, programs, objects, components, data structures, etc. that perform particular tasks or implement particular abstract data types. Targeted advertising may also be implemented in distributed computing environments where tasks are performed by remote processing devices that are linked through a communications network. In a distributed computing environment, application modules may be located in both local and remote computer storage media including memory storage devices.

Figure 5:
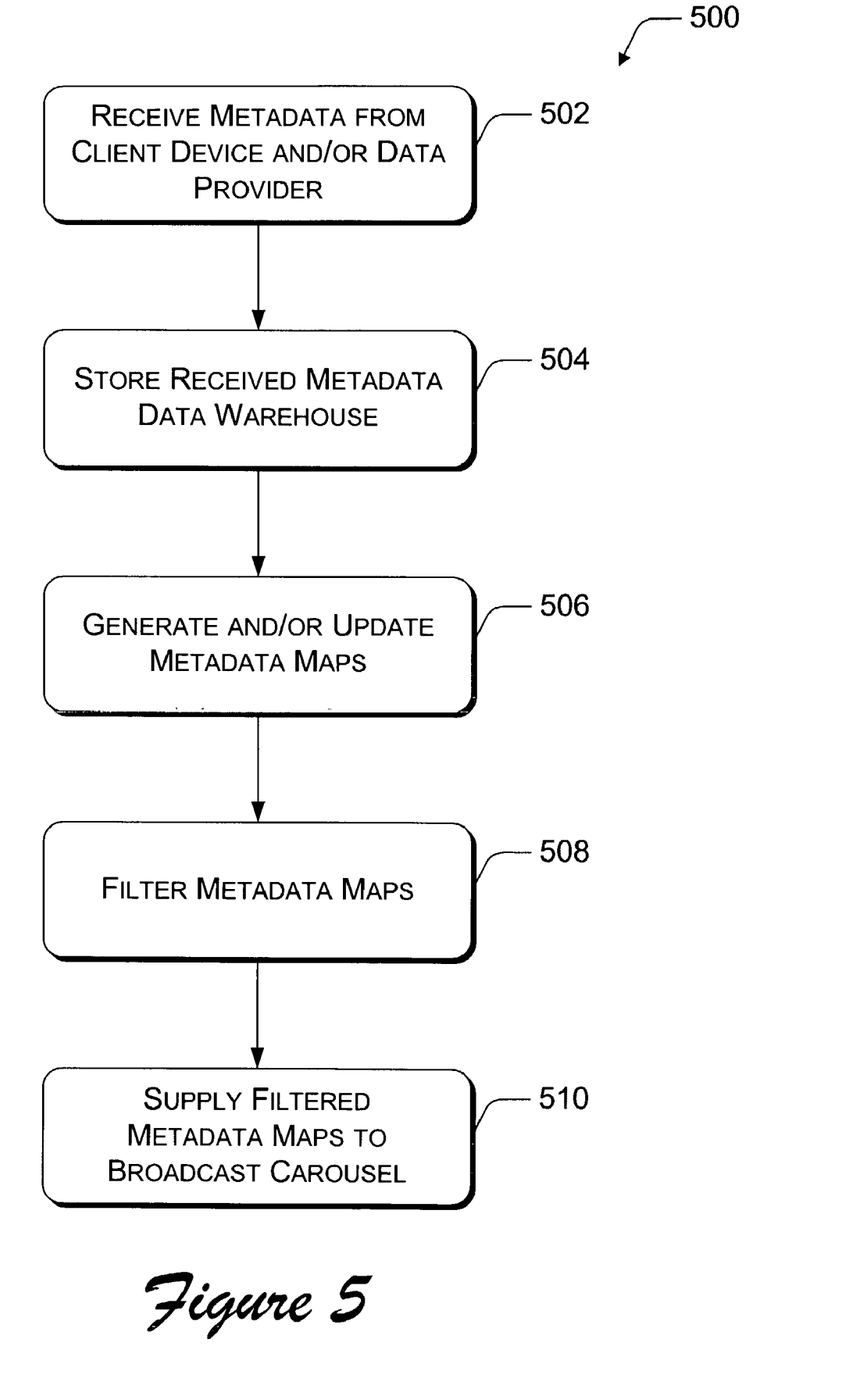
FIG. 5 illustrates a method for generating metadata maps to support targeted advertising.

FIG. 5 illustrates a method implemented in television server 106 for generating metadata maps to support targeted advertising. The order in which the method is described is not intended to be construed as a limitation. Furthermore, the method can be implemented in any suitable hardware, software, firmware, or combination thereof. Where appropriate, the process will be described with respect to components illustrated in FIG. 1.

At block 502, data center 114 receives metadata from client device 108 and/or from data provider 104. In one implementation, data may be received from a client device by way of a back-channel when a user chooses to have their viewing logs collected. The metadata received from data providers 104 may include any data associated with media content, such as titles, descriptions, actors, categorizations, advertisement data, viewing history, and the like. The metadata received from client devices 108 may include the viewing history of one or more users and indicates which programs have been watched and at what times. The received viewing histories may be used to identify groups of programs that are of interest to multiple viewers. The data associated with the groups of programs may then be related in a metadata map.

At block 504, the data center 114 stores the received metadata in data warehouse 124.

At block 506, metadata mapping engine 126 generates (or updates) one or more metadata maps based on data stored in the data warehouse. FIGS. 2 and 3 illustrate example metadata maps. The generated metadata maps are stored in the metadata map repository 128.

In one implementation, a metadata map may be generated that describes relationships between media content such as television programs, movies, web sites, and so on. Based on data stored in the data warehouse 124 that describes content that has been accessed or viewed by users, the metadata mapping engine 126 generates a metadata map, for example, using the Predictor schema that is included as part of Microsoft's Commerce Server. Any number of factors may be used to determine how closely related two programs are. Example factors may include a percentage of a population sampling and viewing frequency. In addition, the metadata mapping engine 126 may use a combination of factors in generating the metadata maps.

For example, data warehouse 124 and metadata mapping engine 126 may be implemented using Microsoft's Commerce Server. The data warehouse 124 may be implemented as a Commerce Server Predictor database and the metadata mapping engine 126 may be the Commerce Server Predictor module. Depending on the factors to be used in generating the metadata maps, the metadata mapping engine 126 may operate on only a subset of the data stored in the data warehouse, for example, when generating a metadata map based on a geographic area.

In generating a metadata map based on a percentage of a population sampling, the metadata mapping engine 126 relates two programs if, for example, 50% of the viewers for whom data is available watched both of the programs. In one implementation, the relationship between programs may be assigned a weighting factor that indicates the strength of the relationship. For example, using the percentage of a population sampling as a basis, the relationship between two programs that were viewed by 50% of the viewers may be assigned a higher weighting factor than the relationship between two programs that were viewed by 25% of the viewers.

In generating a metadata map based on viewing frequency, the metadata mapping engine 126 relates two programs if, for example, when a user watches one program they also watch the second program at least 50% of the time.

In one implementation, the metadata mapping engine 126 generates multiple metadata maps based on geographic areas including media distribution system service areas, direct marketing areas, EPG region definitions in a cable headend, and zip codes. Metadata maps based on geographic area more accurately describe relationships between programs for a given geographic area. For example, television viewers in a city with a successful baseball team may have a higher interest in sports than viewers in a city that does not have a baseball team. By generating metadata maps based on viewer preferences within geographic areas, the metadata maps are more likely to accurately reflect viewer interests.

In an alternate implementation a map of categories may be generated based on categories associated with viewed programs and/or advertisements. In another implementation video on demand purchases from one or more set top boxes may be used to generate one or more metadata maps. In yet another implementation, maps may be generated based on user ratings of programs. Any combination of these and other factors may be used to generate metadata maps that represent how programs, categories, and/or advertisements may be related.

At block 508, the metadata mapping engine 126 filters the generated metadata maps based on data stored in the EPG data repository 120. The EPG data repository 120 stores data that identifies the programs that are scheduled for broadcast in the near future, typically 10-45 days. The metadata mapping engine 126 filters the metadata maps to generate smaller metadata maps that describe the metadata relationships associated only with the programs represented in the EPG data repository 120.

At block 510, the metadata mapping engine 126 supplies the filtered metadata maps to the broadcast carousel 116 of one or more media distribution system 112. Which metadata maps are supplied to which media distribution systems 112 may be determined based on the geographic areas served by the respective media distribution systems 112. In an alternate implementation, metadata maps of various sizes may be supplied to the media distribution systems 112 so that client devices with less available memory can receive smaller metadata maps and client devices with more available memory can receive larger metadata maps.

Figure 6:
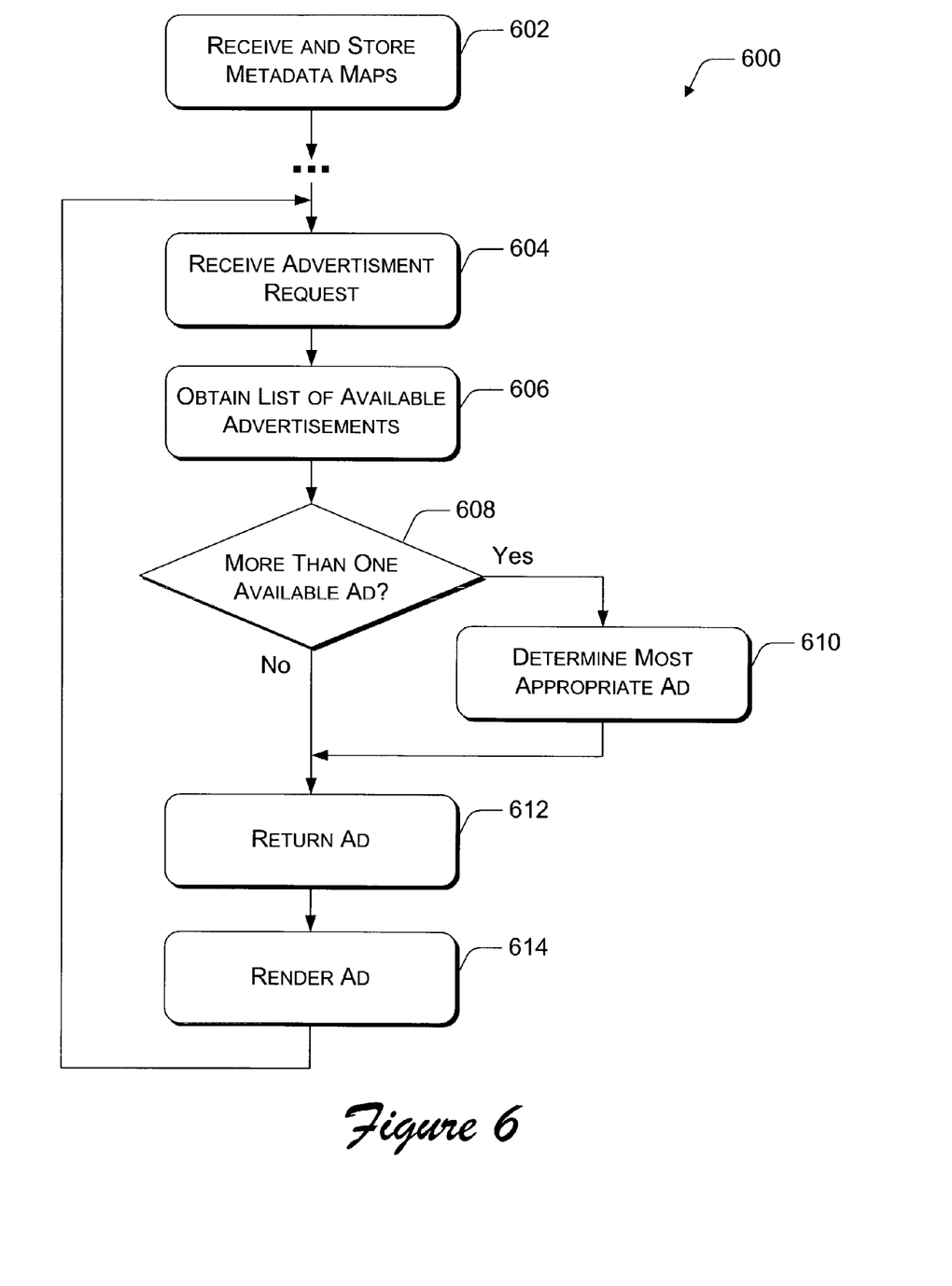
FIG. 6 illustrates a method for selecting advertisements based on metadata maps.

FIG. 6 illustrates a method implemented in client device 108 for selecting advertisements based on metadata mapping. The order in which the method is described is not intended to be construed as a limitation. Furthermore, the method can be implemented in any suitable hardware, software, firmware, or combination thereof. Where appropriate, the process will be described with respect to components illustrated in FIGS. 1 and 4.

At block 602, the client device receives one or more metadata maps from the broadcast carousel 116 of a media distribution system 112 and stores the received metadata maps in the metadata map store 414. Updated metadata maps may be received from the broadcast carousel 116 periodically, for example, once every week. The frequency of updates may be based, for example, on the memory capacity of the client device 108 or on the frequency with which the EPG data repository 120 is updated.

At block 604, after some undetermined length of time, the ad manager 416 receives a request from an application program 410 for an advertisement. In one implementation, the ad request includes data that identifies a page group from which an advertisement is requested. As described above in the description of ad digest 412, a page group is a group of advertisements with a common characteristic, typically display size. The ad request may also include data that describes the users most recently viewed programs. In an alternate implementation, a log of recently viewed programs may be stored by the client device and accessed by the ad manager, rather than being included as part of the ad request.

At block 606, the ad manager 416 requests and receives from the ad digest 412 a listing of all advertisements that are currently available from the broadcast carousel that satisfy the parameters of the ad request, namely the specified page group.

At block 608, the ad manager 416 determines how many advertisements are available that satisfy the ad request. When there is only one ad available that satisfies the ad request (the "No" branch from block 608), then at block 612, the ad manager 416 returns to the requesting application program 410, data identifying the available advertisement. In one implementation, the ad manager 416 provides a link to the ad that is specified in a specialized transport system URL syntax that allows the application to access the advertisement from the broadcast network. In another implementation the ad manager 416 stores the advertisement in memory 406 and a link to the stored advertisement is provided to the calling application.

When there is more than one available advertisement that satisfies the ad request (the "Yes" branch from block 608), then in block 610, the ad manager 416 accesses the metadata map store 414 to determine the most appropriate of the available advertisements based, for example, on the recent viewing history of the user such as the five most recently viewed programs or websites. For example, in one scenario, the advertisement that is selected may be an advertisement for a program that is closely related to the last program that the viewer watched. In another scenario, the selected advertisement may be an advertisement that is associated a category, wherein the category is also associated with the last program that the viewer watched. In yet another scenario, the selected advertisement may be an advertisement that is associated with a category that is closely related to a category that is associated with the last program that the viewer watched. Any number of advertisement selection scenarios may exist, depending on the metadata used to generate the metadata maps.

At block 612, the ad manager 416 returns to the requesting application program 410, data identifying the available advertisement, as described above.

At block 614, the application program 410 displays or otherwise renders the advertisement.

Because the metadata maps are generated based on the viewing histories of multiple viewers, the maps represent the viewing preferences of most viewers. As a result, even if a viewer chooses to not have their viewing history collected and incorporated in the generation of the metadata maps, advertisements can still be targeted to the viewer based on a comparison between the viewer's recent viewing history (stored on the client device) and a metadata map that represents the viewing preferences of a sampling of the population.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
receiving media content descriptions by an interactive television server, the receiving media content descriptions including receiving data that identifies advertisements;
receiving historical viewing data associated with multiple viewers by the interactive television server;
defining relationships among the media content descriptions based on a determination that the historical viewing data indicates that at least one of the multiple viewers has viewed both a first media content and a second media content, without accessing a demographic viewer profile;
generating a plurality of metadata maps that include representations of the relationships that are defined, the plurality of metadata maps being of various sizes so that client devices with less available memory can receive smaller metadata maps and client devices with more available memory can receive larger metadata maps; and
selecting an advertisement to be rendered based on the relationships that are defined and viewing history data associated with a viewer, wherein the selecting is not based on demographic data associated with the viewer.

2. The method as recited in claim 1 wherein the receiving media content descriptions further comprises receiving data that identifies television programs scheduled for broadcast.

3. The method as recited in claim 1 wherein the receiving media content descriptions further comprises receiving data that identifies categories associated with television programs.

4. The method as recited in claim 1 wherein the receiving historical viewing data comprises receiving data that describes at least one of advertisements rendered to one or more of the multiple viewers, advertisements selected by one or more of the multiple viewers, websites accessed by one or more of the multiple viewers, programs viewed by one or more of the multiple viewers, or video-on-demand purchased by one or more of the multiple viewers.

5. The method as recited in claim 1 wherein the defining relationships comprises relating the first media content to the second media content.

6. The method as recited in claim 1 wherein the defining relationships comprises relating a category associated with the first media content to a category associated with the second media content.

7. The method as recited in claim 1 wherein the defining relationships comprises relating a category associated with the first media content to the second media content.

8. The method as recited in claim 1 wherein the selecting an advertisement comprises identifying an advertisement that is associated with a category, the category also being associated with media content identified in the viewing history data associated with the viewer.

9. The method as recited in claim 1 wherein the viewer is not one of the multiple viewers.

10. The method as recited in claim 1 wherein the viewing data associated with the viewer comprises an indication of a media content currently being presented to the viewer.

11. The method as recited in claim 1 wherein the viewing data associated with the viewer comprises historical viewing data associated with the viewer.

12. A method comprising:
receiving at a server, historical viewing data from multiple viewers;
generating, by the server, a metadata map that represents aspects of historical viewing patterns of the multiple viewers as indicated by the historical viewing data, the server further generating a plurality of metadata maps of various sizes so that client devices with less available memory can receive smaller metadata maps and client devices with more available memory can receive larger metadata maps, wherein the metadata map identifies:
a relationship between a first media content and a second media content, wherein the relationship indicates that a viewer who enjoys the first media content is therefore also likely to enjoy the second media content,
wherein the generating comprises defining the relationship between the first media content and the second media content based on a determination that a plurality of the multiple users have each viewed both the first media content and the second media content from within the same geographical area; and
serving the metadata map to a client device such that the client device can use the metadata map to facilitate targeted advertising to a viewer.

13. The method as recited in claim 12 wherein the geographical area is a direct marketing area.

14. The method as recited in claim 12 wherein the serving comprises broadcasting the metadata map to a television set-top box through a media distribution system.

15. The method as recited in claim 12 wherein the viewer is not one of the multiple viewers.

16. A user entertainment system comprising:
a metadata map store configured to store data that defines relationships among media content descriptions, the relationships having been:
generated based on an analysis of historical user viewing patterns gathered from a plurality of viewers wherein the historical user viewing patterns indicates that at least one of the plurality of viewers has viewed both a first media content and a second media content; and
received by the user entertainment system from a server system as a metadata map, the metadata map being one of a plurality of metadata maps of various sizes, the particular metadata map that is received having been selected based on an amount of available memory in the user entertainment system; and
an ad manager configured to:
receive a request for an advertisement to be presented via the user entertainment system, the request originating from an application program in the user entertainment system;
identify advertisements that are available for presentation via the user entertainment system; and
determine an appropriate advertisement, from the advertisements that are available, based on a comparison between the relationships stored in the metadata map store and data that identifies media content recently presented via the user entertainment system, wherein the determination is not based on viewer demographic data.

17. The system as recited in claim 16, further comprising an application program configured to request and render an advertisement.

18. A computer storage device comprising computer executable instructions that, when executed, direct a computing system to:
store a plurality of metadata maps that each represent relationships defined by an analysis of historical viewing patterns of multiple viewers, the plurality of metadata maps being of various sizes so that client devices with less available memory can receive smaller metadata maps and client devices with more available memory can receive larger metadata maps;
receive a request from a client device for an advertisement of a particular display size;
select an advertisement from a plurality of advertisements such that, based on a metadata map of the plurality of metadata maps, the advertisement is directly related to recently viewed media content and the advertisement is not selected based on demographic viewer profile data.

19. The computer storage device as recited in claim 18, further comprising executable instructions that, when executed, direct the computing system to render the advertisement that is selected.

* * * * *